Feb. 10, 1948.                J. H. WELLS ET AL                 2,435,663
                          PROCESS FOR RECOVERING PYRIDINE
                               Filed July 12, 1945
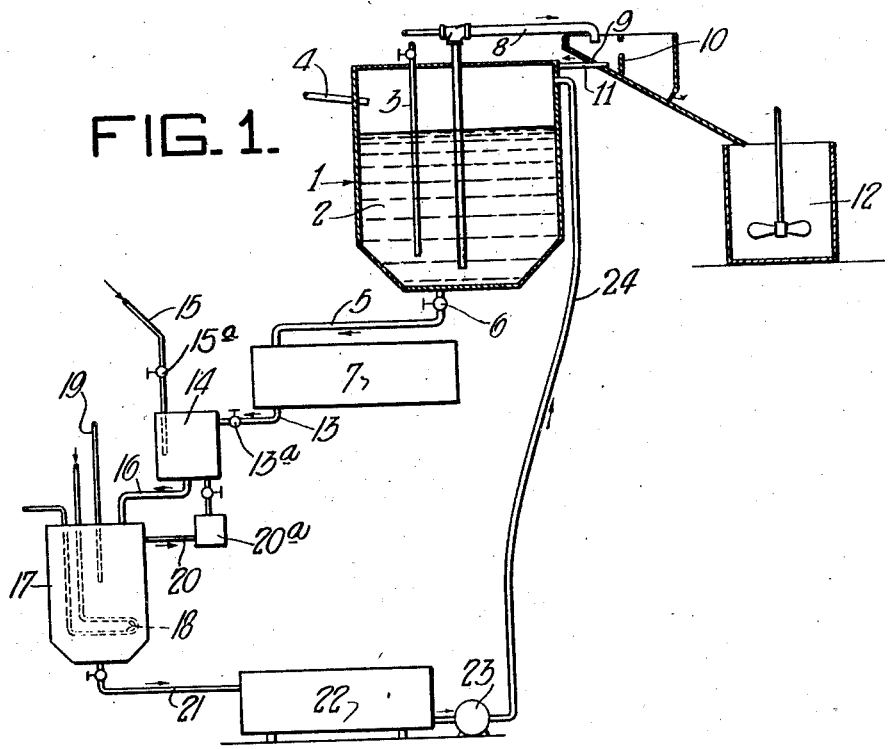
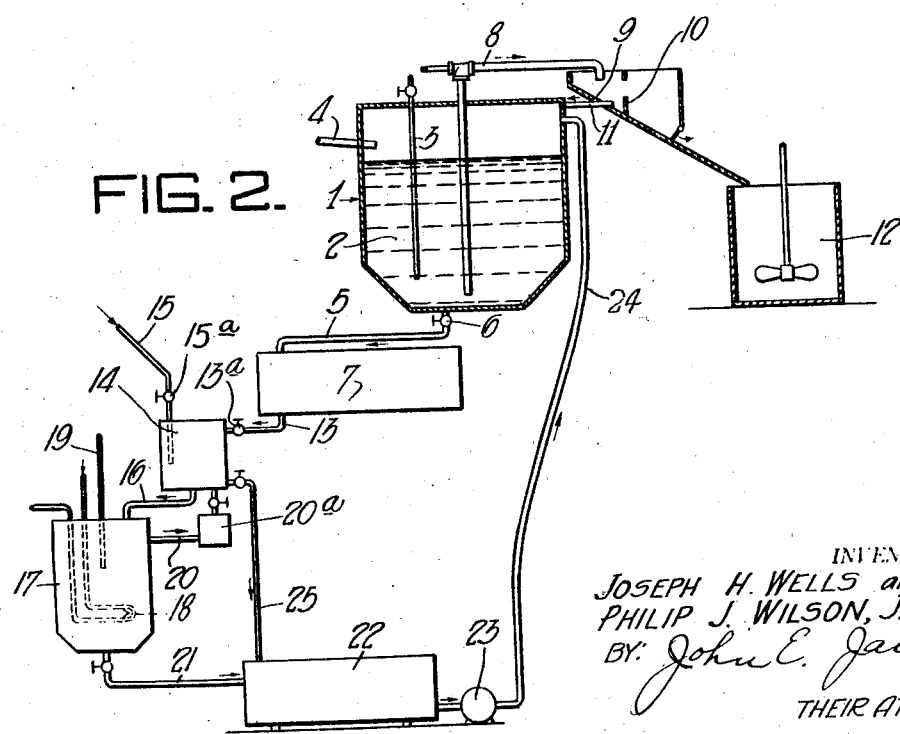
INVENTORS:
JOSEPH H. WELLS and
PHILIP J. WILSON, JR.
BY: John E. Jackson
                THEIR ATTORNEY Patented Feb. 10, 1948

2,435,663

UNITED STATES PATENT OFFICE 2,435,663

PROCESS FOR RECOVERING PYRIDINE

Joseph H. Wells and Philip J. Wilson, Jr., Pittsburgh, Pa., assignors to Carnegie Illinois Steel Corporation, a corporation of New Jersey Application July 12, 1945, Serial No. 604,596

6 Claims. (Cl. 260—290)

The recovery of pyridine and its homologues as coke plant by-products, is becoming of increasing economic importance, and a number of processes have been developed to increase the efficiency and yield of the recovery of these materials.

The present invention has for its principal object the provision of a quick, efficient and inexpensive process for recovering pyridine.

After the products of coal distillation in a by-product coke plant have been subjected to a number of processes, which are well known in the art, for removing tarry constituents, the vapors pass from a preheater to a piece of equipment termed a saturator. Here the basic constituents of the vapors contact an acid solution of ammonium sulphate which contains, in addition to sulphuric acid and ammonium sulphate a large number of impurities.

The basic compounds present in the gas coming from the preheater are, primarily, ammonia and pyridine. Hence the liquid in the saturator, which is a sulphuric acid solution of ammonium sulphate, herein referred to as the "saturator mother liquor," would contain, in time, an appreciable amount of valuable pyridine and pyridine homologues unless steps were taken to remove such compounds.

Such removal is accomplished simply and by the process of the present invention, the advantages of which will be pointed out hereinafter, and, which will be understood more readily by reference to the accompanying drawings.

In these drawings:

Fig. 1 represents a diagrammatic flow sheet of the usual process employed for recovering pyridine and its homologues from vapors produced in the destructive distillation of bituminous coal, the view illustrating the various steps of the process, and being included merely for purposes of comparison with Fig. 2 which represents a diagrammatic flow sheet of the improved process of the present invention, the view illustrating the steps of the simplified procedure of the present process as compared with the illustration of Fig. 1.

Referring to the drawings, reference number 1 represents the saturator, which is a vessel usually of from 2,000 to 4,000 gallons capacity, which contains a sulphuric acid solution saturated with ammonium sulphate indicated at 2, which is referred to as the "saturator mother liquor," into which liquid, pipe 3 conducts the vapors passing from a preheater, not shown. The percentage of free acid in the saturator mother liquor is maintained usually at from about 5% to about 7%, this being accomplished by adding fresh acid from time to time through acid inlet 4. Portions of the mother liquor are removed from time to time through outlet 5 provided with a valve 6, and collected in a storage tank 7, which is lined with lead. At the usual rates of operation, about 500 gallons are drawn off daily and subsequently processed to recover some of the compound contained therein.

When the ammonia in the gas which enters through pipe 3 reacts with the free acid in the saturator liquor, some ammonium sulphate crystallizes and precipitates.

From time to time this is removed by a steam lift 8 and into a drain pan 9, where liquid carried over with it is separated by means of a baffle 10 and returned to the saturator through a suitable pipe 11. The crystalline ammonium sulphate is conveyed to a whizzer 12 where the remaining liquid is removed, all in a conventional manner.

Returning now to the liquid in storage tank 7, portions of it are drawn off through outlet 13 provided with a valve 13a and led into a neutralizer 14 into which ammonia from the crude ammonia stills is introduced through pipe 15.

This ammonia first neutralizes free sulphuric acid in the liquor:

$$2NH_3 + H_2SO_4 (NH_4)_2SO_4$$

On continuing addition of ammonia, pyridine and its homologues are displaced from combination with sulphuric acid by the ammonia, in accordance with the well known fact that a strong base will displace a weak base from compounds of the weak base:

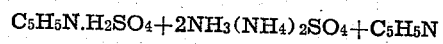
$$C_5H_5N.H_2SO_4 + 2NH_3 (NH_4)_2SO_4 + C_5H_5N$$

Similar reactions may be written for the homologues of pyridine.

The mixture of the bases which thus are liberated from their combination with sulphuric acid is only slightly soluble in the solution of ammonium sulphate which is left, and separates as a brown oil on the top. A convenient method of separation is to draw off this liquor leaving the free bases in the tank.

The saturator mother liquor contains, however, in addition to the pyridine, other compounds in solution or suspension in small amounts. Compounds which are dissolved include iron and aluminum sulphates, arsenic, and other metallic compounds. Such materials may have been picked up in storage tanks or pipes in which the acid or gas containing the ammonia and pyridine was handled, or may have been present originally in the sulphuric acid added to the ammonium sulphate saturators. Compounds in suspension may be particles of tar or other organic matter.

When the liquor is made alkaline with the ammonia, many of these compounds are precipitated or coagulated. In their finely-divided form, they act as emulsifying agents for the droplets of pyridine bases to produce emulsions which frequently are difficult to break, either by heating, allowing to stand, or by other means.

When an emulsion is present, the ammonium sulphate liquor cannot be separated completely by drawing it off from the bases. It will contain either a large proportion of the bases in the emulsified form, or if only clear liquor is drawn off, the upper layer of bases will contain a large proportion of the liquor which interferes in the refining of the pyridine bases.

In accordance with prior practices, the neutralized solution passed to another vessel, such as that indicated as 17, by way of a pipe 16, where it is subjected to steam distillation accomplished by either steam coils, such as are indicated at 18, or open steam may be introduced through pipes 19, and the distillate, which passes through a pipe indicated at 20 into a receiver 20a contains most of the pyridine and its homologues, together with large amounts of water vapor. The pyridine is obtained subsequently after appropriate dehydrating operations are performed. The liquid remaining in vessel 17 largely is an ammonium sulphate solution. Therefore, it may be conducted through pipe 21 to a storage tank 22, from which it may be returned by suitable pumping means 23 and pipe 24 to the saturator, possibly after each time a portion of the mother liquor has been removed to tank 7 for processing. In this way, the volume of liquid in saturator 1 is maintained at a fairly constant operating level.

A number of disadvantages are associated with the foregoing procedure, including, and by way of example, the necessity of separating the water-pyridine product into water and pyridine, as well as the necessity for separating by an expensive and time-consuming steam distillation, pyridine bases and their homologues from the neutralized ammonium sulphate solution.

Moreover, the bases may not be completely removed by the steam distillation in case they have not been released adequately from combination with sulphuric acid by neutralization with ammonia. Also, the condensed steam dissolves in the bases, and must be removed by a dehydration process. The disadvantages of this method of recovery have been brought out by other investigators.

Thus, the precipitation of iron salts and tarry matter when the solution becomes alkaline has been mentioned by Marquard in United States Letters Patent No. 1,589,809.

H. J. Meredith, "Recovery of pyridine bases from coke oven gas," Gas Journal, Feb. 4, 1942, states that iron compounds are precipitated when the solution becomes alkaline and the removal of tar bases from the liquor is seriously reduced if it becomes too acid. In order to separate the pyridine bases, he neutralized the saturator liquor to a pH of from 6 to 7, and distilled off the bases. However, Rhodes and Younger (Industrial and Engineering Chemistry, vol. 5, page 302 (1933) showed that liberation of pyridine from a sulphate solution started at a pH of 2.8 but was not completed until pH 8.5 is reached. The liberation of lutidines started at pH 7.0 and was completed at 12.0; that of the collidines started at pH 5 and was completed at about pH 10.

Dodge and Rhodes in United States Letters Patent No. 1,274,998 state that it is necessary to saturate saturator liquor with ammonia to liberate the bases, and then steam distill for their recovery.

The present improved process is based upon the discovery that the inherent disadvantages of the process can be avoided by operating in such a manner that there is eliminated a steam distillation treatment subsequent to the neutralization of the saturator liquor; and when a steam distillation process is not used for separation of the bases, there are avoided the difficulties involved in the breaking of emulsions and separation of the mother liquor, iron salts and other constituents of the emulsion from the bases.

In accordance with the present invention, it is discovered that if the saturator liquor containing the mixed pyridine bases is sprung to a pH of between pH 8 and pH 9, a substantially complete springing of the bases is obtained without the formation of emulsions, so that the layer of pyridine bases can be removed by decantation. But if the pH is raised above pH 9, iron and other metallic salts are precipitated, thereby causing the formation of an emulsion of pyridine bases and water stabilized by metallic hydroxide, tarry matter, and other impurities. If the neutralization is stopped below that of pH 8, a loss of pyridine bases results.

The improved process of the present invention is carried out by adding ammonia to the mother liquor in neutralizer 14, in a uniform manner, with careful noting of the pH of the solution at frequent intervals, thus making it possible to carry the neutralization to exactly the desired degree. It is found in practice that if the neutralization of the liquor in the neutralizer 14 is carried only to pH of 8.5 to 9.0, the emulsions produced in the former hit-or-miss neutralization will not be produced, and a sharp separation of the bases on the liquor results. However, if the pH goes above 9.0, emulsions are produced.

In the practice of the invention, the ammonia is admitted through pipe 15, which is controlled by a valve 15a, at a uniform rate until a pH of 8 is obtained. The amount of ammonia then is reduced, and is stopped before the pH reaches 9, by closing valve 15a.

The lower layer of the mixture is drawn off through pipe 25 and conveyed to storage tank 22 until it is relayed back to the saturator 1 by suitable pumping means 23 and pipe 24.

The separated bases then are flowed into the receiver 20a.

In the claims, the term "pyridine compounds" is intended to include pyridine and its homologues.

The present application is a continuation-in-part of the copending application Serial No. 472,268, dated January 13, 1943, now abandoned, for Process for recovering pyridine and its homologues.

We claim:

1. The process of recovering pyridine compounds from vaporous products produced in the distillation of bituminous coal in by-product coke plants, which comprises passing the distillation vapors, after removal of tarry constituents therefrom, from a preheater into an acidified solution of ammonium sulphate, thereby absorbing into the solution basic materials including pyridine compounds, introducing ammonia into the said solution until the solution reaches a pH value of from pH 8 to pH 9, then discontinuing passage of ammonia, thereby causing a separation of the pyridine compounds from the remaining solution, and recovering the said separated pyridine compounds.

2. The process of recovering pyridine compounds from vapors produced in the distillation of bituminous coal in by-product coke plants, which comprises passing the distillation vapors, after removal of tarry constituents therefrom, into an acidified solution of ammonium sulphate, thereby absorbing in the solution basic components of the vapors including the pyridine compounds contained therein, introducing ammonia into the said solution until the solution reaches a pH value of pH 8.5 to pH 9, then discontinuing passing the ammonia, thereby causing a separation of the said pyridine compounds from the remaining solution, and recovering the separated pyridine compounds.

3. The process of recovering pyridine compounds from vapors produced in the distillation of bituminous coal in by-product coke plants, which comprises passing the distillation vapors, after removal of tarry constituents therefrom, into an acidified solution of ammonium sulphate, thereby absorbing in the solution basic components of the vapors including the pyridine compounds contained therein, introducing ammonia into the solution in controlled amounts until the solution reaches a pH value of between pH 8 and pH 9, discontinuing introduction of ammonia when the pH of the solution reaches the said value, thereby causing separation of the pyridine compounds from the remaining solution, and recovering the separated pyridine compounds by decantation.

4. The process of recovering pyridine compounds from vapors produced in the distillation of bituminous coal in by-product coke plants, which comprises passing the distillation vapors into a sulphuric acid solution of ammonium sulphate, thereby absorbing in the solution basic components of the vapors including the pyridine compounds, neutralizing the resulting solution by passing ammonia therein until the solution reaches a pH value between pH 8.5 and pH 9, then discontinuing passing the ammonia, thereby causing a clean separation of pyridine compounds from the remaining solution, and recovering the said separated compounds by decantation.

5. The process of recovering pyridine compounds from vapors produced in the distillation of bituminous coal in by-product coke plants, which comprises passing the distillation vapors, after removal of tarry constituents therefrom, into a sulphuric acid solution of ammonium sulphate contained in a saturator, thereby absorbing in the solution basic components of the vapors including the pyridine compounds contained therein, drawing off a portion of the resulting solution from the saturator into a neutralizer, introducing ammonia into the solution in the neutralizer in controlled amounts until neutralization thereof is effected and the pH of the solution reaches a value between pH 8 and pH 9, thereupon discontinuing introduction of the ammonia, thereby causing an unemulsified separation of the pyridine compounds from the remaining solution, recovering the separated pyridine compounds by decantation, and returning the remaining solution in the neutralizer to the saturator.

6. The process of recovering pyridine and its homologs from the vapors produced in the distillation of bituminous coal in by-product coke plants which comprises passing the distillation vapors through a sulphuric acid solution containing ammonium sulphate contained in a saturator thereby absorbing the basic components of said vapors including pyridine and its homologs, periodically drawing off a portion of the resulting solution from the saturator to a neutralizer, adding ammonia to the solution in the neutralizer until the pH value of such solution reaches a pH value of 8.5 to 9.0, thereupon discontinuing passing the ammonia in such solution, thereby causing a clean separation of the pyridine compounds from the remaining solution, recovering the said separated compounds by decantation, and returning the remaining solution in the neutralizer to the saturator.

JOSEPH H. WELLS.
PHILIP J. WILSON, Jr.

REFERENCES CITED

The following references are of record in the file of this patent:

UNITED STATES PATENTS

| Number | Name | Date |
|---|---|---|
| 1,274,998 | Dodge et al. | Aug. 6, 1918 |
| 1,589,809 | Marquard | June 22, 1926 |
| 2,279,585 | Wald | Apr. 14, 1942 |

FOREIGN PATENTS

| Number | Country | Date |
|---|---|---|
| 4,766 | Great Britain | Nov. 16, 1905 |

OTHER REFERENCES

Hach's Chemical Dictionary, 3rd edition, page 497.

H. J. Meredith, "Recovery of Pyridine Bases from Coke Oven Gas," Gas Journal, Feb. 4, 1942, pages 166 and 169.